United States Patent
Pedersen et al.

(10) Patent No.: US 6,878,276 B2
(45) Date of Patent: Apr. 12, 2005

(54) METHODS OF MAKING STRETCHED FILTERING MEMBRANES AND MODULES

(75) Inventors: Steven Pedersen, Burlington (CA); Pierre Cote, Dundas (CA)

(73) Assignee: ZENON Environmental Inc., Oakville (CA)

( * ) Notice: Subject to any disclaimer, the term of this patent is extended or adjusted under 35 U.S.C. 154(b) by 192 days.

(21) Appl. No.: 10/314,334

(22) Filed: Dec. 9, 2002

(65) Prior Publication Data

US 2003/0111407 A1 Jun. 19, 2003

Related U.S. Application Data

(60) Provisional application No. 60/338,676, filed on Dec. 11, 2001.

(30) Foreign Application Priority Data

Dec. 21, 2001 (CA) .............................................. 2365817

(51) Int. Cl.$^7$ .............................................. B01D 69/08
(52) U.S. Cl. ........................... 210/500.23; 210/321.79; 210/321.88; 264/41; 264/177.17; 264/210.7; 264/209.5
(58) Field of Search ............................. 264/41, 177.17, 264/210.7, 209.5; 210/500.23, 321.79, 321.88

(56) References Cited

U.S. PATENT DOCUMENTS

| | | |
|---|---|---|
| 3,457,589 A | 7/1969 | Gordon |
| 4,020,230 A | 4/1977 | Mahoney et al. |
| 4,115,492 A | 9/1978 | Mahoney et al. |
| 4,276,255 A | 6/1981 | Russell |
| 4,405,688 A | 9/1983 | Lowery et al. |
| 4,541,981 A | 9/1985 | Lowery et al. |
| 4,664,681 A | 5/1987 | Anazawa et al. |
| 4,741,829 A | 5/1988 | Takemura et al. |

(Continued)

FOREIGN PATENT DOCUMENTS

| | | |
|---|---|---|
| GB | 2 041 821 | 9/1980 |
| JP | 52137026 | 11/1977 |
| JP | 55137209 | 10/1980 |
| JP | 57005914 | 1/1982 |
| JP | 57028139 | 2/1982 |

(Continued)

OTHER PUBLICATIONS

Yang, Ming–Chen; Chou, Ming–Tze, Effect of Post–Drawing on the Mechanical and Mass Transfer Properties of Polyacrylonitrile Hollow Fiber Membranes, Journal of Membrane Science, vol. 116 (1996), pp. 279–291.

*Primary Examiner*—W. L. Walker
*Assistant Examiner*—K S Menon
(74) *Attorney, Agent, or Firm*—Bereskin & Parr

(57) ABSTRACT

A method for stretching a hollow fibre while making a stretched filtering membrane from a precursor involves wrapping the hollow fibre around a structure and modifying the structure such that at least portions of the hollow fibre are forced to elongated. For example, the hollow fibre may be wrapped around around two or more supports and the distance between adjacent supports increased. This produces first portions of the hollow fibre stretched to a first elongation and porous to a first porosity and second portions of the hollow fibre that are not stretched or are stretched to a second elongation less than the first elongation and that remain non-porous or become porous to a second porosity which is less than the first porosity. The membrane may be made into a module with second portions of the membranes located at points where the membranes exit the potting material or at turns in loops of the fibres, if any. In various embodiments, the fibre is potted into modules before or after it is stretched. Some methods of potting involve applying a hot melt adhesive to the second portions. Some embodiments are made entirely of thermoplastic material and can be easily recycled.

18 Claims, 6 Drawing Sheets

U.S. PATENT DOCUMENTS

| | | | |
|---|---|---|---|
| 4,764,320 A | | 8/1988 | Chau et al. |
| 4,919,856 A | | 4/1990 | Anazawa et al. |
| 5,032,274 A | * | 7/1991 | Yen et al. ............... 210/500.42 |
| 5,139,529 A | | 8/1992 | Seita et al. |
| 5,232,642 A | | 8/1993 | Kamo et al. |
| 5,238,562 A | | 8/1993 | Rogut |
| 5,284,583 A | | 2/1994 | Rogut |
| 5,294,338 A | | 3/1994 | Kamo et al. |
| 5,328,610 A | | 7/1994 | Rogut |
| 5,332,498 A | | 7/1994 | Rogut |
| 5,435,955 A | | 7/1995 | Kamei et al. |
| 5,470,659 A | | 11/1995 | Baumgart et al. |
| 5,547,756 A | | 8/1996 | Kamo et al. |
| 5,639,373 A | | 6/1997 | Mahendran et al. |
| 5,716,689 A | | 2/1998 | Rogut |
| 5,882,461 A | | 3/1999 | Rogut |
| 2003/0226797 A1 | | 12/2003 | Phelps |

FOREIGN PATENT DOCUMENTS

| | | | | |
|---|---|---|---|---|
| JP | 58004810 | | 1/1983 | |
| JP | 59196706 | | 11/1984 | |
| JP | 6146811 | | 12/1984 | |
| JP | 60137402 | | 7/1985 | |
| JP | 60139815 | | 7/1985 | |
| JP | 62019206 | | 1/1987 | |
| JP | 62045318 | | 2/1987 | |
| JP | 62079806 | | 4/1987 | |
| JP | 64014315 | | 1/1989 | |
| JP | 01270907 | | 10/1989 | |
| JP | 03224621 A | * | 10/1991 | ........... B01D/63/02 |
| JP | 04265132 | | 9/1992 | |
| JP | 04265133 | | 9/1992 | |
| JP | 04293529 | | 10/1992 | |
| JP | 06015152 | | 1/1994 | |
| JP | 06246139 | | 9/1994 | |
| JP | 06246140 | | 9/1994 | |
| JP | 07080263 | | 3/1995 | |
| JP | 07116483 | | 5/1995 | |
| JP | 07157580 | | 6/1995 | |
| JP | 10323546 | | 12/1998 | |
| JP | 00093766 | | 4/2000 | |
| WO | WO 02/34373 | | 5/2002 | |
| WO | WO 03/059496 | | 6/2003 | |
| WO | WO03/059496 | | 7/2003 | |

* cited by examiner

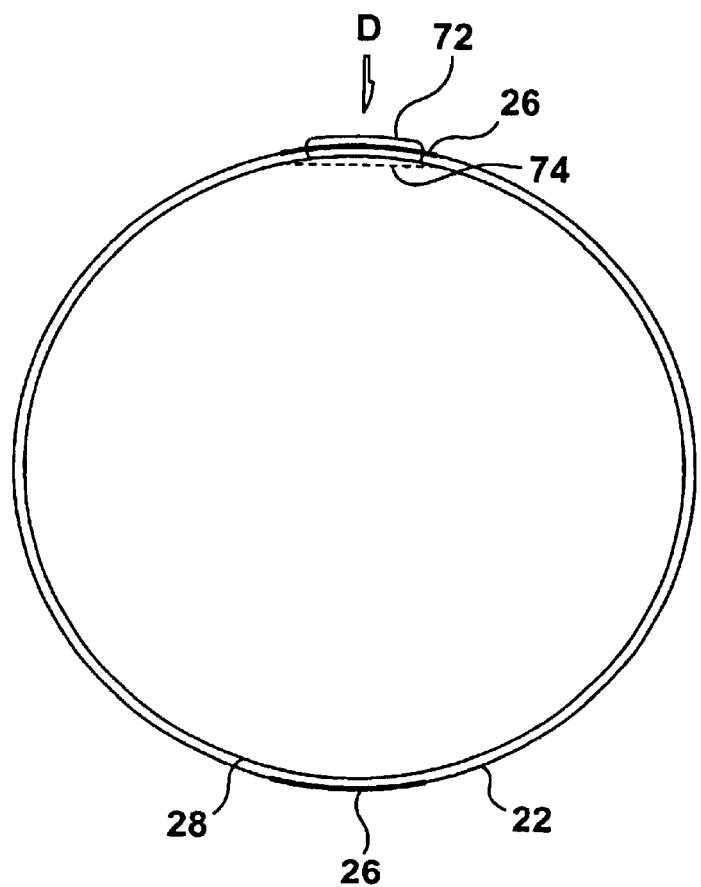
FIG. 9
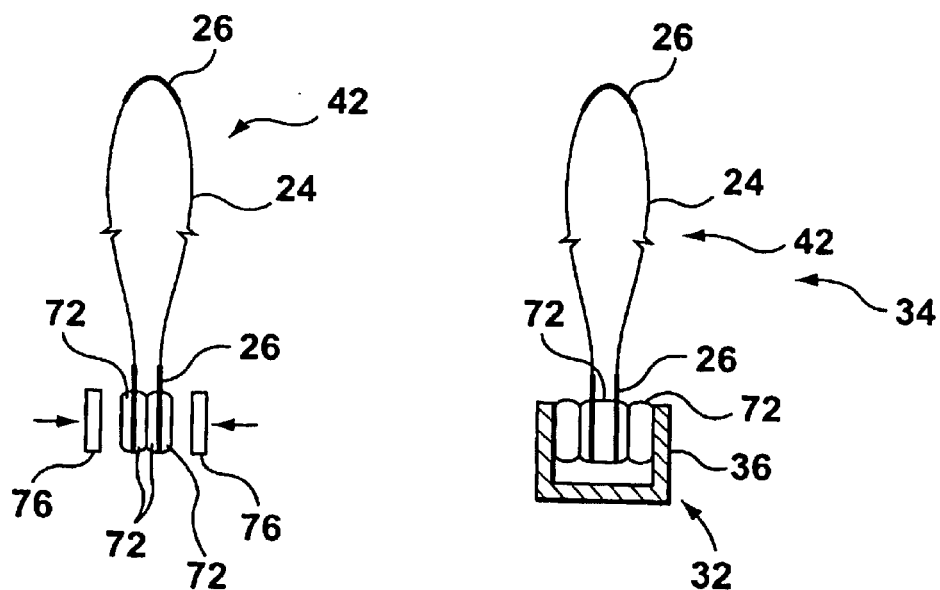
FIG. 10  FIG. 11

METHODS OF MAKING STRETCHED FILTERING MEMBRANES AND MODULES

FIELD OF THE INVENTION

This invention relates to filtering membranes and in particular to a method of making stretched filtering membranes, a module of stretched filtering membranes and a method of making such a module.

BACKGROUND OF THE INVENTION

Stretched membranes are a class of filtering membranes. Stretched membranes are typically made by first forming a non-porous hollow fibre of an appropriate membrane material. The membrane material is typically a thermoplastic such as polypropylene (PP), polyethylene (PE) or, less frequently, PVDF. The membrane material can be formed into a nonporous hollow fibre by various methods such as extruding or melt-spinning. The non-porous hollow fibre (often called a precursor) is then treated by a variety of processes which typically include annealing steps and stretching steps (typically at specified temperatures, rates of elongation, and total elongation) to produce pores within a desired size range in the fibres. The processes generally share a common strategy of providing a non-uniform composition in the fibre with areas having a crystalline structure dispersed throughout the fibre. When the fibre is stretched, the membrane material between the crystalline structures tears into a series of microfibrils alternating with elongated pores oriented along the length of the fibres.

A large number of specific processes have been described in the art. While following the generally strategy outlined above, these processes may differ, among other things, in the number of annealing or stretching steps, the order of the annealing or stretching steps and the temperature, changes in temperature, total elongation or rate of elongation specified for any particular stretching step.

A typical plant for making stretched membranes allows for generally continuous production. For example, in one area of the plant, precursor may be formed by extruding a continuous fibre that passes over a series of rollers designed to stretch the fibres to a final dimension (but without producing pores) and allow the fibre to cool before it is wound around a take up spool. Once full, the take up spools are then mounted into the head of a stretching apparatus. The stretching apparatus may consist of a series of chambers each having a plurality of rollers of differing diameters and turning at different speeds. The fibre is threaded through the various rollers of the chambers in series to a take up roll at the tail end of the stretching apparatus. The different speeds and diameters of the rollers in each chamber causes the fibre to be stretched (or not stretched for annealing) at selected speeds and to selected elongations as it passes through each chamber. The temperature of each chamber is individually set as desired for stretching or annealing. The total length of the path (around the various rollers) in each chamber and the average speed of the fibre through each chamber can be chosen to achieve a desired length of time that the fibre is exposed to the temperature prevalent in each chamber. As long as the fibre does not break, a continuous fibre of stretched filtering membrane winds continuously onto the take up roll at the tail end of the plant. Once a roll of fibre is produced, membrane modules can be made by various techniques.

SUMMARY OF THE INVENTION

It is an object of the present invention to improve on the prior art and provide a method of making stretched filtering membranes, a module of stretched filtering membranes and a method of making such a module. The invention achieves these goals through the combinations or sub-combinations of features specified in the claims, this summary or the description of embodiments.

The inventors have observed various problems with the existing art. Some problems relate to the existing methods of making stretched fibres. Expensive and intrusive capital equipment is required to make large amounts of stretched fibres. Changes to any part of the process may require difficult design changes to the various chambers, rollers, or roller drive mechanisms in a plant. Further, the residence time in each chamber is significant and so the rate of production, even with multiple fibres simultaneously moving through a plant, is low in relation to the size of a plant. A break in a fibre also causes significant down time since the fibre must be re-threaded through the plant.

Others problems relate to the stretched fibres themselves. Stretched membranes are somewhat delicate, kink easily and may break prematurely in use. In particular, when individual fibres are folded over into a loop, for example with both open ends of the fibre potted into the same header, the stretched membranes may kink or break at the turn of the loop. The fibres may also break where they exit the resin of the header, particular in applications where the modules are heavily agitated to encourage the fibres to sway. The stretched membranes are also easily damaged by heat. These problems increase with the porosity of the membranes, with microfiltration membranes in particular being prone to damage during handling.

The inventors have addressed these and other problems by creating new methods for stretching the precursor and new ways of using the membranes created by this method to make modules.

To stretch the precursor, one or more strands of precursor are wound around a structure and the structure is modified such that at least portions of the hollow fibre are forced to elongate. For example, the precursor may be wound around two or more supports. The supports are mounted onto a support moving apparatus adapted to move the one or more supports away from each other at one or more speeds, for one or more times or to hold the supports apart from each other at one or more distances as required according to a selected regimen for making stretched membranes.

Where the stretching regimen requires a non-ambient environment, the fibre is subjected to the required environment, for example an increased temperature, by locating the supports with the fibre wrapped around them inside of a controlled environment chamber. Surprisingly, such a batch method can produce a higher output of stretched material than a continuous process for the same size of controlled environment chambers. Since the precursor is tougher and 2 to 10 times shorter than the stretched fibre, thousands of turns can be wound around a set of supports quickly. Such a method also allows easy modification to the regimen for making the stretched membranes and exceptional control. The displacement of the supports from each other, the tension on the fibre, the speed that the supports move at any particular displacement, the temperature or changes in temperature and other parameters can be easily achieved through a wide variety of mechanisms, for example, a motor and heater controlled by a PLC attached to force, temperature and distance sensors. Finally, broken fibres do not significantly disrupt the process.

In the methods described above, portions of the precursor that contact a support do not stretch significantly. Friction against the support and adjacent turns of the fibre cause the tension in the fibre to rapidly drop off after the points of tangency between the fibre and the support. Areas between the points of tangency may have some elongation, and may even become porous to a small degree, but at least a portion of the fibres has sufficiently small elongation and porosity that its mechanical properties are appreciably better than the mechanical properties of portions of the fibre from between adjacent supports. To provide a further variation in the mechanical properties of a fibre that is to be stretched while heated, the atmospheric chamber may be configured to heat areas between the supports more intensely or the supports may be heat sinked so that portions adjacent the support remain cooler.

The resulting fibre has unstretched or less stretched portions (which will collectively be referred to as unstretched portions for brevity) and stretched portions. The stretched portions are useful as a filter media. The unstretched portions can be cut out and discarded leaving individual stretched hollow fibre membranes. The unstretched, however, retain some or all of the qualities of the precursor which can be used to advantage. In particular, the unstretched portions are less brittle and are more resistant to kinking and heating. By locating the unstretched portions of the fibre at one or more high stress points in a module, the overall reliability or service life of the module can be greatly increased with very little loss in filtration capacity. For example, unstretched portions can be located at the turn of the loop of a looped fibre or at the point where the fibre exists the potting material of a header or both. The unstretched portions, because of their better heat resistance, can also be used with potting methods in which a hot melt adhesive is attached to the fibre.

Locating the unstretched portions in selected locations can be done after a strand of partially stretched and partially unstretched fibre is produced. Alternately, precursor can be first arranged in a geometrical configuration appropriate for use in a module and then stretched. Further alternately, the precursor can be potted into a header before the fibres are stretched, the header becoming one of the supports. Because the precursor is tougher than the stretched fibre, the precursor can be arranged in a desired geometrical configuration or potted faster and with less breakage. The precursor can also be potted with hot melt adhesives.

Modules with the stretched and unstretched portions of fibres at the appropriate places can be made by various methods. In some methods, the stretched or unstretched portions form a regular alternating pattern. A point on the fibre can then be indexed or registered to a bundle, fabric or array forming apparatus so that a bundle, fabric or array is formed with the unstretched portions in the desired places. In another method, the supports and support moving apparatus are configured, and the precursor wound around them, to produce membranes in the approximate geometrical configuration that they will have in the module. The supports can be kept with the fibres or replaced with a smaller replacement support. For a module of looped fibres, for example, a support or replacement support can remain with the fibres at the turn of the loop. For potting, a small replacement support can be used which leaves unstretched portions long enough to give sufficient contact with the potting resin. The replacement support can then be immersed in potting material with the fibres. After the potting material hardens, the replacement support can be cut out, which also cuts open and exposes the ends of the fibres. For this method, the fibre may be wound around the supports such that the adjacent lengths of fibre are separated from each other at the support by a distance at least sufficient to allow the potting medium to surround the fibre and provide a good seal.

In other methods, a hot melt adhesive is used. For example, the fibre may be cut into individual fibres of a desired length and potted according to the fugitive potting method described in U.S. Pat. No. 5,639,373 which is incorporated into this document by this reference. According to this method, a hot melt adhesive temporarily holds the fibres together. By placing unstretched portions where the hot melt adhesive will be applied, the fibre is able to withstand the heat of the adhesive.

In other methods, the fibres are not potted in a resin, but rather in a hot melt adhesive alone. The hot melt adhesive may be applied to the supports or precursor as the precursor is wrapped onto the supports. Alternately, the hot melt adhesive may be applied to the hollow fibre membrane after it is stretched but still wound on the supports. Further alternately, the fibres may be transferred to a drum having a diameter chosen so that unstretched portions of the fibres are adjacent each other, ie one or more lines of unstretched portions extends across the width of the drum for application of the hot melt adhesive. In these methods, one or more bands of hot melt adhesive are melted across a band of unstretched portions or precursor which will be at the unstretched portions. Further layers of fibre or precursor and hot melt adhesive may be added and adhered to a first layer of fibre or precursor. The fibre is later cut, for example through or adjacent to a band of glue, to provide distinct fibres with open ends held in relation to each other by a mass of hot melt adhesive. The mass of hot melt adhesive may then be glued into a pan, optionally of a thermoplastic material, to create a header or manifold. Optionally, the mass of hot melt adhesive itself forms a header or manifold. For example, a the hot melt adhesive may be cut to both expose open ends of the fibres and create a channel in the hot melt adhesive which permits fluid connection of the ends of the fibres to one or more pipes. By either method, modules may be made entirely of thermoplastic material. Such modules can be easily recycled.

BRIEF DESCRIPTION OF THE DRAWINGS

FIGS. 9–11 are representations of a process for potting fibres into a permeate pan using a hot melt adhesive.

DETAILED DESCRIPTION OF EMBODIMENTS

Figure 1:
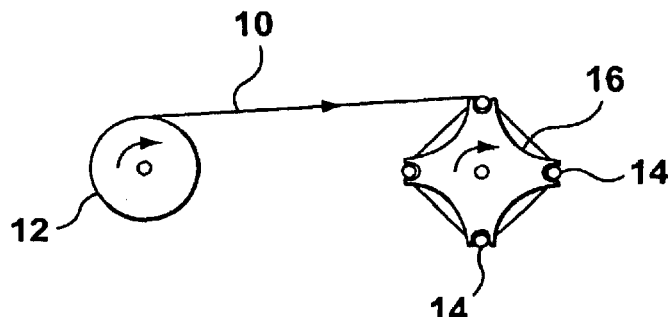
FIGS. 1 to 3 are schematic representations of a method of making stretched membranes.
Figure 2A:
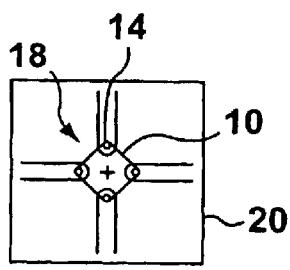
Figure 2B:
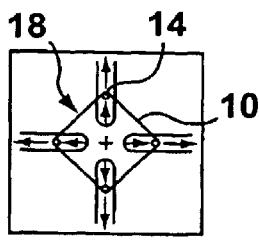
Figure 2C:
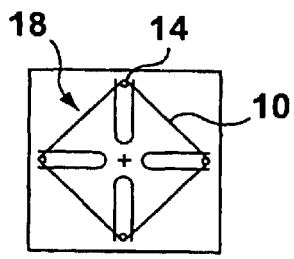
Figure 3:
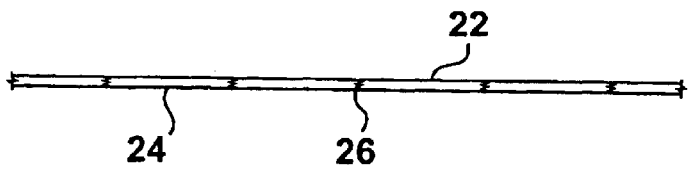

FIGS. 1 to 3 give a schematic representation of a method of making stretched membranes.

In FIG. 1, precursor 10 is wound off of a precursor spool 12 and wrapped around a plurality of supports 14. For example, the supports 14 may be metal rods with their ends slipped into notches in an opposed pair of support holding plates 16. Two, three, four or more supports 14 may be used. To provide a reasonably consistent tension in the precursor 10, a dancer arm assembly may be used between the precursor spool 12 and the supports 14. With the use of a dancer arm or other means to account for variations in take up speed of the supports, precursor 10 may be wrapped directly around the plurality of supports 14 as it is made. In this way a precursor spool 12 is not required. By any technique, the precursor 10 may be wound around the supports 14 to multiple layers to increase the output of the process.

In FIG. 2, the supports 14 have been removed from the support holding plates and mounted into a support moving apparatus 18. Alternately, precursor 10 maybe wound directly onto supports 14 already on the support moving apparatus 18. For steps requiring non-ambient conditions, the support moving apparatus 18 is placed inside a controlled environment chamber 20, for example a heating chamber, as shown in FIG. 2A. To stretch the precursor 10, the support moving apparatus 18 is operated to move adjacent supports 14 away from each other. As shown in FIG. 2B for example, the supports 14 are driven away from the center of the support moving apparatus 18 by a driving device (not illustrated). According to many regimens for making stretched membranes, this step would be performed while the controlled environment chamber 20 is heated and there may be multiple stretching steps. In FIG. 2C, the precursor 10 has been stretched to its desired elongation. According to many regimens, the precursor may be annealed at a selected temperature as it is held at its maximum elongation. FIGS. 2A, 2B and 2C are illustrative only and the support moving apparatus 18 can be placed in or removed from one or more controlled environment chambers 20 or other treatment areas as desired for any particular regimen. For example, the supports 14 may be held at a fixed distance from each other, may be moved away from each other at steady speeds or unsteady speeds, may be moved away from each other in one or more steps taken at various temperatures or may be moved towards or away from each other at a constant force or strain rate, etc.

Moving adjacent supports 14 away from each other creates tension in the precursor 10. Due to friction between the precursor 10 and the supports 14 and between adjacent turns of the precursor 10, this tension decreases sharply a short distance behind the points of tangency between the fibre and the supports. For example, with PE precursor on a cylindrical, unpolished steel support 14, tension in the fibre may be reduced in half only 20 degrees behind the points of tangency and is further reduced towards a minimum at halfway between the points of tangency. Further, as the precursor stretches, it work hardens and requires more force to produce a further elongation. As a result, portions of the fibre between the two points of tangency will be less stretched than portions of the fibre held between adjacent supports.

As shown in FIG. 3, a membrane fibre 22 is produced having, over a sufficient length, alternating stretched areas 24 and unstretched areas 26. The term unstretched areas is used for simplicity, but may include portions of the membrane fibre 22 that are stretched to less elongation and porosity compared to the stretched areas 24. For example, the stretched areas 24 may have elongations of over 200% while the unstretched areas 26 have elongations of less than 50% or less than 25%. Similarly, the stretched areas are highly porous and have pore sizes and permeability sufficient to make them useful as a filtration media, for example as a microfiltration or ultrafiltration membrane. The unstretched areas 26 may also have some pores, but their permeability is minimal. The unstretched areas 26 retain the mechanical properties of the precursor 10 to a large extent, and are appreciably more durable and flexible than the stretched areas 24.

The length of the unstretched areas 26 may be a few or several centimeters, for example 3–12 cm. The length and degree of elongation or permeability of the unstretched areas 26 can be altered by changing the size of a cylindrical support 14 or by using a support 14 of altered size or cross-section. For example, a rectangular support, with rounded edges to avoid damaging the membrane fibre 22, can be used to produce a long unstretched area 26 of minimal or no elongation and permeability. By altering the initial spacing between supports 14 in relation to the desired percentage elongation, the length of the stretched areas 24 can also be altered. The lengths of the stretched areas 24 and unstretched areas 26 may each be constant, or may be made to vary along a membrane fibre 22.

The stretched areas 26 are typically visibly distinct from the unstretched areas 24. For example, with PE, the stretched areas 26 are an opaque white whereas the unstretched areas 24 remain semi-translucent like the precursor 10. If individual hollow fibre membranes having only unstretched areas 24 are desired, the stretched areas 26 can be cut out and discarded.

The membrane fibre 22 can be cut into distinct hollow fibre membranes for potting into a module. For example, in FIG. 4, the membrane fibre 22 is cut while it is still wrapped around the supports 14. Cutting the membrane fibre 22 reveals a plurality of individual hollow fibre membranes that can be collected together into a bundle. The bundle can be inserted, for example, into a liquid potting resin or other potting material and centrifuged. By cutting at location A, the resulting hollow fibre membranes will have unstretched areas 26 in their middles. If used to make a looped fibre, the unstretched areas 26 can be located at the turns of the loops. By cutting, for example with a knife, at B through the unstretched area 26, the resulting hollow fibre membranes will have unstretched areas 26 at their ends. If used in a module having membranes potted between a pair of headers, such membranes can be potted to have unstretched areas 26 where they exit the potting material. By cutting at C through the unstretched areas 26, the resulting hollow fibre membranes will have unstretched areas 26 in their middles and their ends. If used to make a looped fibre, the unstretched areas 26 can be located at the turns of the loops and where the membranes exit the potting material. Since the turn of a loop and the point where a membrane exits potting material are high stress areas in a module, the additional durability of the unstretched areas 26 increases the durability of a module.

The membrane fibre 22 may also be transferred from the support moving apparatus 18 to other conventional devices for preparing the membrane fibre 22 for potting. The membrane fibre may be first transferred to a spool so that the support moving apparatus 18 may be returned to use stretching precursor 10. By either method, the location of the unstretched areas 26 should be tracked in whatever machine takes up the membrane fibre 22. For example, if the membrane fibre 22 will be made into a fabric, the unstretched areas 26 can be located to advantage at turns in the membrane fibre 22.

Figure 5:
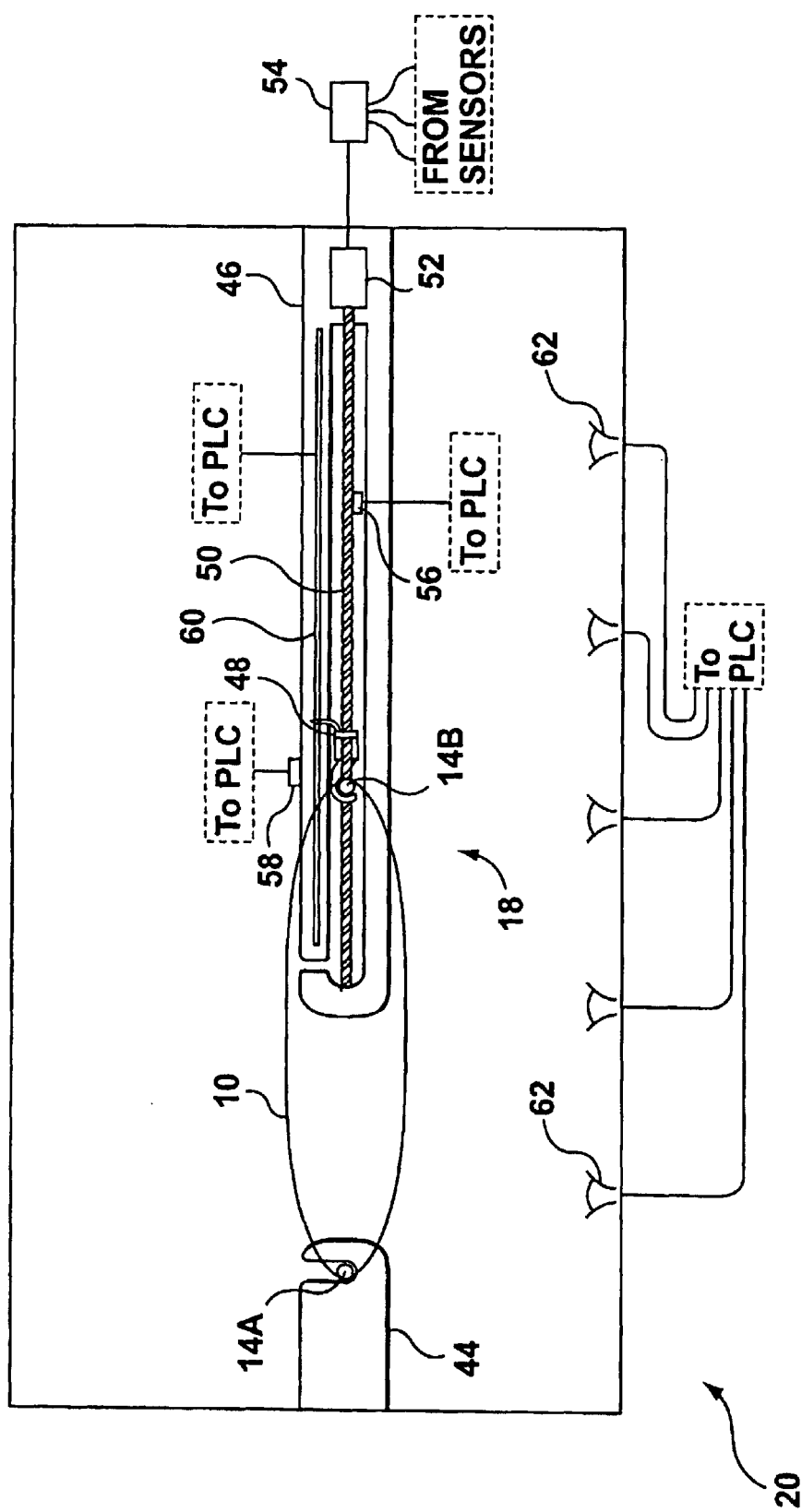
FIG. 5 is a schematic representation of a support moving apparatus located inside of a controlled environment chamber.

FIG. 5 shows a support moving apparatus 18 and controlled environment chamber 20 in greater detail. The support moving apparatus 18 is adapted for use with two supports 18 and a plurality of such support moving apparatuses may be located in a single controlled environment chamber 20. The precursor 10 is shown loosely wrapped around the supports to allow it to stick out in the drawing although it would typically be taut between the supports 14. A first support 14A rests in a notched plate 44 attached to one side of the controlled environment chamber 20. The second support 14B rests in a channel of a channeled plate 46. A pair of hooks 48 are hooked to the second support 14B and also slide in the channel. Threaded rods 50 are threaded onto the hooks 48 at each side of the second support 14B and may be turned by motors 52 which cause the second support 14B to move within the channel. The motors 52 are controlled by a programmable logic controller (PLC) 54 connected to various sensors. The sensors may include a strain sensor 56 to measure the strain in (and force exerted by) the threaded rod 50, a temperature sensor 58 and a position sensor 60. The PLC 54 may also be used to control one or more heating elements 62 which may be turned on an off individually. Heat may be provided to areas between the supports 14 more intensely by, for example, turning on only those heating elements 62 between the supports 14, by shielding or insulating an area near the supports 14 or heat-sinking the supports 14 so that an area near or adjacent the supports 14 remains cooler. Such an apparatus allows almost any stretching regimen to be followed.

Figure 6:
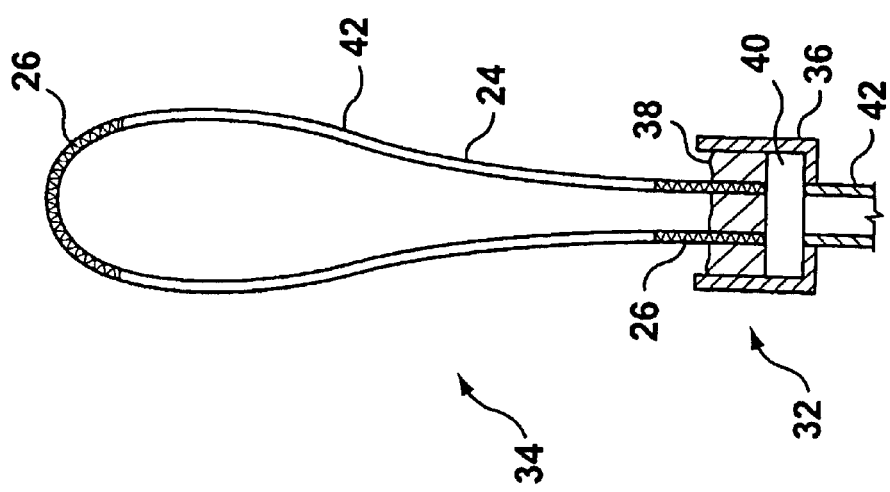
FIG. 6 is a cross section of a looped fibre potted into a header.

FIG. 6 shows a cross section of a header or manifold 32 of a module 34. The header includes a pan 36 and a solidified potting material 38 defining a plenum 40. A pipe 42 allows feed or permeate to flow into or out of the plenum 40. A hollow fibre membrane 42 made according to one or more of the methods described above has its ends potted in the potting material 38 and open to the plenum 40. Unstretched areas 26 are located at the turn of a loop in the hollow fibre membrane 42 and where the hollow fibre membrane 42 exits the potting material 38.

Figure 4:
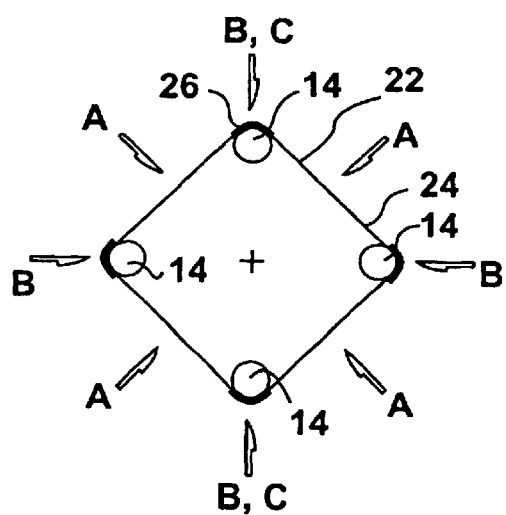
FIG. 4 is a schematic representation of methods of producing short fibres for potting from a set of supports.

To make a module 34 as shown in FIG. 6, a membrane fibre 22 can be cut to produce distinct hollow fibre membranes 42 with unstretched areas 26 in the appropriate places. For example, cuts can be made at points C in FIG. 4 to produce hollow fibre membranes 42 which can be potted using any suitable method for potting distinct fibres. To produce a module with a pair of opposed headers, cuts can be made at points B as shown in FIG. 4. Alternately, a plurality of separate lengths of precursor 10 can be first arranged in a geometrical configuration appropriate for use in the module 32 and then stretched. In this case, the open ends of the lengths of precursor 10 are held in a clamp rather than wrapped around a support 14 for stretching.

Figure 7:
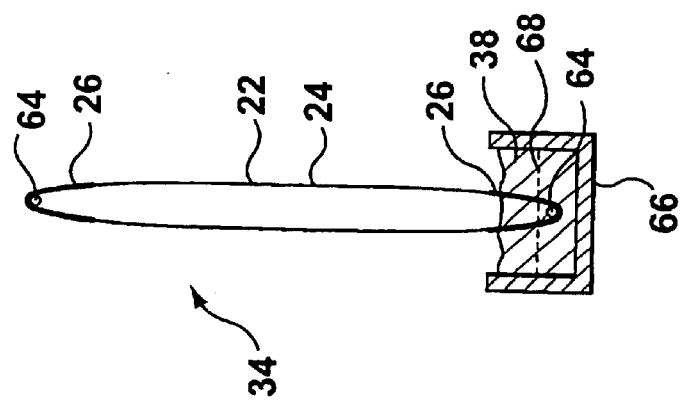
FIG. 7 is a schematic representation of a method for using replacement supports to create a module.

FIG. 7 shows another method of making a module 34 like the one in FIG. 6. One or more lengths of membrane fibre 22 are wrapped around a pair of replacement supports 64 with unstretched areas 26 located near the replacement supports 64. At one end, the unstretched areas 26 are sufficiently long on either side of the replacement support 64 for potting an area of the membrane fibre 22 near the membrane support 64. To ensure that the potting material 38 surrounds and seals each part of the membrane fibre 22 that passes through it, the membrane fibre 22 may be wrapped around the replacement supports 64 so that adjacent unstretched areas 26 are spaced a minimum distance apart. Alternately, a limited number of layers of membrane fibre 22 may be wrapped around the replacement supports 64, but the replacement supports 64 positioned close enough to each other to cause adjacent turns of membrane fibre 22 to spread out. The membrane fibre 22 is also made sufficiently loose in relation to the surface energy between the potting material 38 and membrane fibre 22 to ensure that potting material 38 surrounds each length of membrane fibre 22.

To pot the module 34, one replacement support 64 with the membrane fibre 22 wrapped around it may be inserted into a liquid potting material 38 held in a potting container 66. After the potting material 38 hardens, it is cut along the cut line 68 to create and expose open ends of hollow fibre membranes 42. Alternately, a fugitive potting method may be used in which the area below the cut line 68 is filled with a fugitive material instead of the potting material 38. After the potting material 38 hardens, the fugitive material and container 66 are removed. The membrane fibre 22 can then be cut as described above.

To wrap the membrane fibre 22 around the replacement supports 64, a dancer arm assembly may be used to transfer the membrane fibre 22 from any support moving apparatus 18. Alternately, the support moving apparatus 18 may be configured to produce membrane fibre 22 in a geometrical configuration appropriate for use in the module 34. For example, the support moving apparatus 18 of FIG. 5 will produce membrane fiber 22 in a configuration appropriate for the module 34 of FIGS. 6 and 7. The precursor 10 may be wrapped around the supports 14 at the same spacing or number of layers that will be used around the replacement supports 64. The replacement supports 64 can then be slipped directly into the place occupied by the supports 18 to transfer the membrane fibre 22 to the replacement supports 64.

Figure 8:
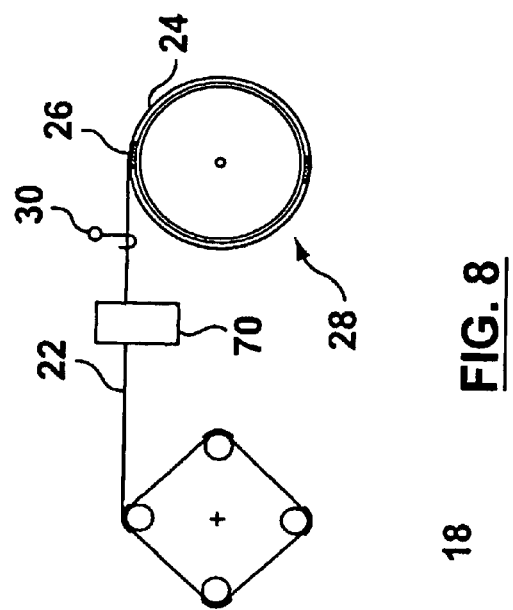
FIG. 8 is a representation of a fibre being transferred from a set of supports to a drum.

FIG. 8 shows another method of transferring the membrane fibre 22. The membrane fibre is unwound from a support moving apparatus 18 and onto a membrane fibre drum 28 through a dancer arm assembly 70. The membrane fibre 22 may be wound in one or more layers, and randomly or orderly. For example, a random winding may be appropriate when the membrane fibre 22 will alter be fed from the drum 28 into another machines for preparing the membrane fibre 22 for potting. When feeding into another machine, the location of the unstretched areas 26 is tracked by the machine to make best use of the unstretched areas 26. For example, if the membrane fibre 22 will be made into a fabric, the unstretched areas 26 can be located to advantage at turns in the membrane fibre 22, for example at the edge of the fabric.

To produce an orderly arrangement of the membrane fibre 22 on the drum 28, the diameter of the drum 28 may be chosen so that the unstretched areas 26 are located generally across the width of the drum but at a limited number of angular positions on the drum 28. Replacement supports 64 may be slipped under the unstretched portions 26 or into channels in the drum 28 under the unstretched portions 26. The drum can then be removed and the membrane fibre 22 will be transferred to the replacement supports 64. This method can be used, for example, to transfer membrane fibre 22 from more than two supports 14 onto two replacement supports 64. To produce a more orderly arrangement, a guide 30 moving across the width of the membrane fibre spool 28 at an appropriate speed may be used to space adjacent turns of membrane fibre 22 apart from each other. The spaced membrane fibre 22 may then be transferred to replacement supports 64 as described above.

With the membrane fibre 22 transferred to a drum 28, other potting methods may also be used. The following potting methods may also be used without a drum 28 by applying hot melt adhesive to the precursor 10 or hollow fibre membrane 42 while it is on or being wrapped onto the support moving apparatus 18 either before or after stretching.

FIGS. 9 to 11 show one method. In FIG. 9, membrane fibre 22 is wrapped around a drum 28 with unstretched sections 26 located in two bands on the circumference of the drum 28. The membrane fibre 22 is wrapped such that adjacent turns are a minimum spacing away from each other. A hot melt adhesive 72, formulated for low viscosity and melt temperature, is placed on one of the bands of unstretched sections 26. In the area where the hot melt adhesive 72 is applied, the drum 28 may have a recess 74 to allow hot melt adhesive 72 to surround the membrane fibre 22. Alternately or additionally, a band of hot melt adhesive can be placed on the drum 28 before the membrane fibre is wound on. If the hot melt adhesive 72 does not fully surround each unstretched area 26 of the membrane fibre 22, it can be re-melted with a hot press to achieve a fluid tight seal around each turn of the membrane fibre 22. Multiple layers of membrane fibre 22 can be applied to the drum 28 by alternating layers of hot melt adhesive 72 with membrane fibres 22. Alternately, a similar result can be achieved by wrapping the precursor 10 as described above around the supports 14 which may have indents 74 or be provided with a flat face under where the unstretched portions 26 will be to assist in applying the hot melt adhesive 72. If only one layer of precursor 10 or membrane fibre 22 is desired, the hot melt adhesive 72 may be applied either before or after stretching. If multiple layers or membrane fibre 22 are desired, the hot melt adhesive 72 can be applied in layers surrounding the precursor 10 as the precursor 10 is wound onto the supports 14 before stretching. The hot melt adhesive 72 can be melted to the precursor 10 either before, during or after stretching. If necessary, the area around the supports 14 can be heat sinked, insulated or protected by baffles and the controlled environment chamber 20 can be configured so that the hot melt adhesive 72 is not heated too much during stretching. In the following paragraphs, further steps will be described in relation to membrane fibre 22 wrapped onto a drum 28, but similar steps can be used for membrane fibre 22 wrapped around supports 14.

After the membrane fibre 22 is wound onto the drum 28 and sealed with hot melt adhesive 72, it can be cut as shown at D and removed from the drum 28. The cutting also creates a plurality of distinct hollow fibre membranes 42 with open ends. As shown in FIG. 10, the hollow fibre membranes 42 can be folded over to make a loop with opposed open ends adjacent each other. The two masses of hot melt adhesive 72 associated with the ends of the hollow fibre membranes 42 can be joined to each other, for example, by placing a melted mass of hot melt adhesive 72 in between them and allowing it to solidify. Alternately, as shown in FIG. 10, hot plates 76 can be used to re-melt the hot melt adhesive 72 and fuse the two parts together. As shown in FIG. 11, this entire assembly can be glued with more hot melt adhesive 72 into a pan 36 to produce a header or manifold 32. If the pan 36 is made of an appropriate thermoplastic, the resulting module 34 will be made entirely of thermoplastic materials and will be easily recyclable.

Figure 12:
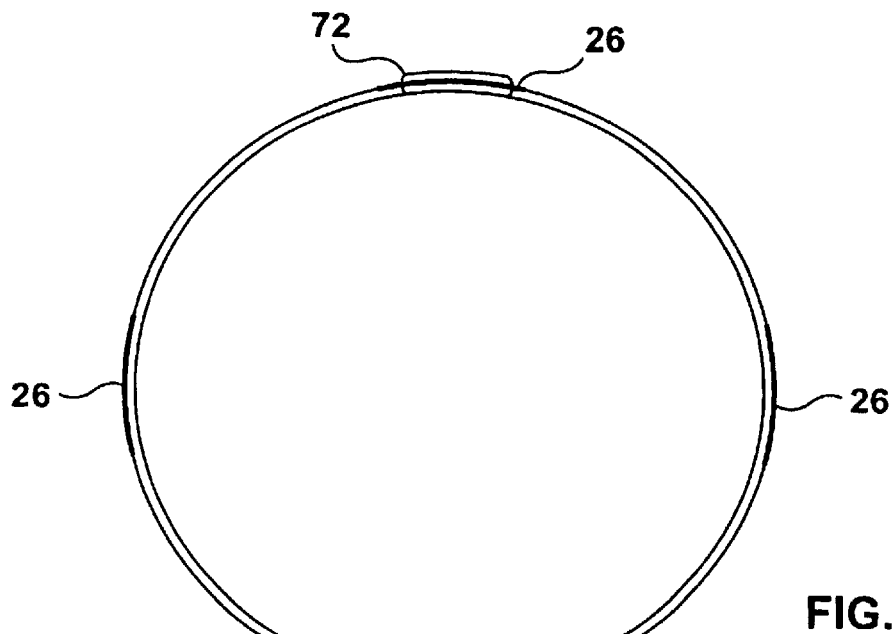
FIGS. 12–15 are representations of a process for potting fibres using a hot melt adhesive without a permeate pan.
Figure 13:
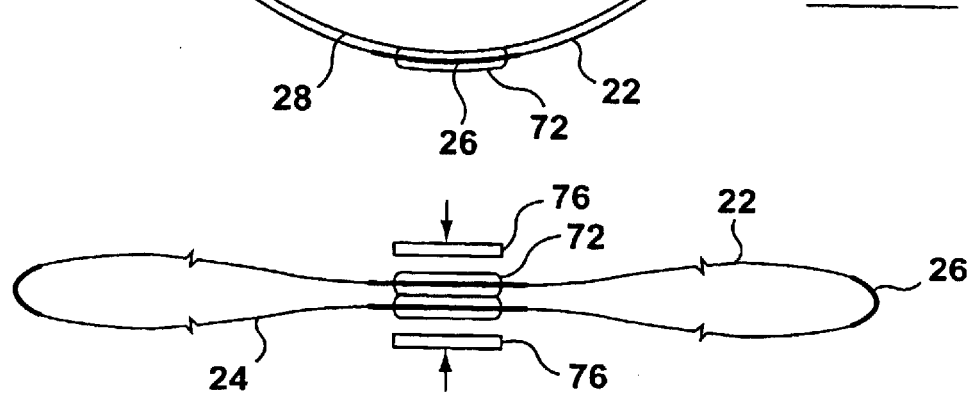
Figure 14:
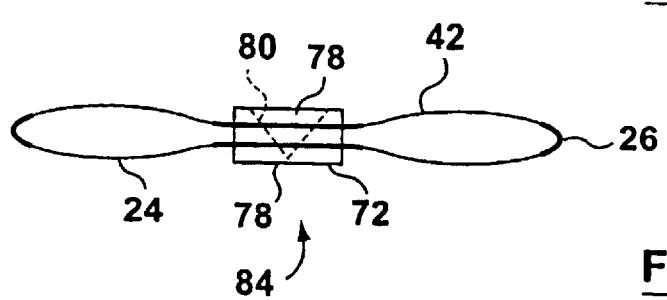
Figure 15:
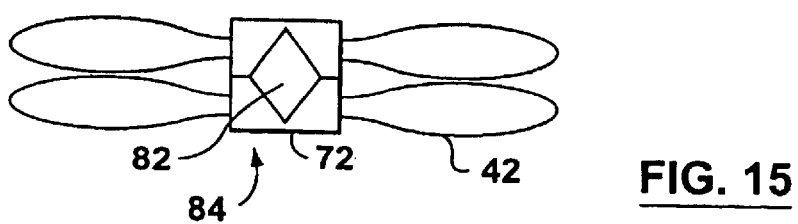

FIGS. 12–15 show another method of making a module 34. As shown in FIG. 12, membrane fibre 22 is wound around a drum 28 as in FIG. 9. As for FIG. 9, the following method can also be performed on the supports 14 directly with hot melt adhesive 72 applied to either the precursor 10 or membrane fibre 22 either before, during or after winding the precursor 10 onto the supports 14 and before or after stretching. The following description will refer to membrane fibre 22 wrapped onto a drum 28 but will apply to membrane fibre 22 wrapped around supports 14. Unstretched portions 26 are located in four bands about the circumference of the drum and hot melt adhesive 72 is applied in two opposed locations of unstretched portions 26. The drum 28 is then removed. As shown in FIG. 13, the two opposed masses of hot melt adhesive 72 are brought together to produce opposed loops of membrane fibre 22. The two masses of hot melt adhesive 72 are glued together with more hot melt adhesive or fused together by heated plates 76. Heated plates 76 are also used to create two generally smooth roughly paralle opposed sides 78 of the hot melt adhesive 72, as shown in FIG. 14. The hot melt adhesive 72 and membrane fibre 22 is cut along the cut lines 80 shown in FIG. 14 to create distinct hollow fibre membranes 42 with open ends. As shown in FIG. 15, two such assemblies can be fused or glued together to create an element 84 having a channel 82 in fluid connection with the open ends of the hollow fibre membranes 42. A plurality of these elements 84 can be placed together back to back and a cap optionally of thermoplastic material glued to the elements 84 to provide a header or manifold in communication with the channels 82. Such an assembly can be made entirely of compatible materials such that it is easily recyclable.

Figure 16:
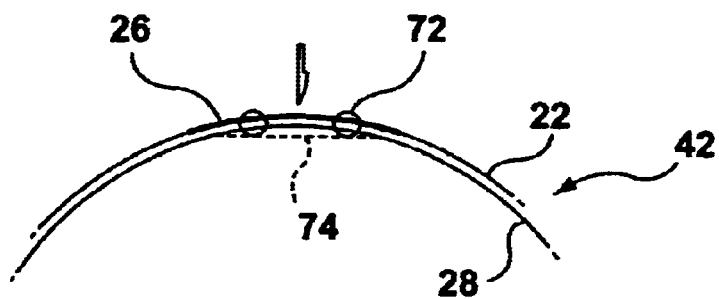
FIG. 16 is a representations of an alternate method of forming collections of distinct fibres on a drum.
Figure 17:
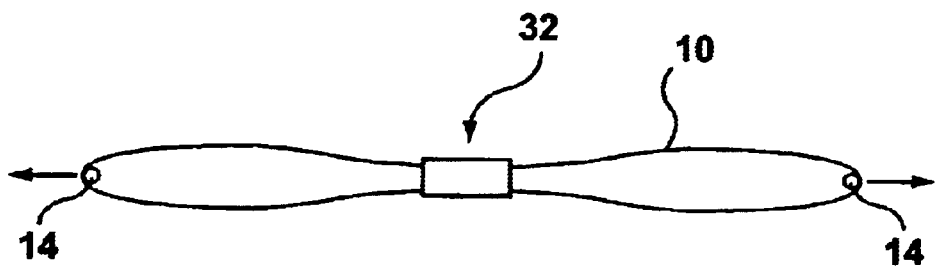
FIGS. 17 and 18 are representations of methods in which fibres are first potted and then stretched.

FIG. 16 shows an alternate methods of forming collections of distinct fibres on a drum 28. In this method, two bands of hot melt adhesive 72 are placed across a single band of unstretched portions. The unstretched prtions 26 are then cut in between the two bands of hot melt adhesive. The resulting distinct hollow fibre membranes 42 can be used in methods analogous to the ones described above or the fugitive potting method described in U.S. Pat. No. 5,639,373 which is incorporated into this document by this reference. According to this method, the individual lengths of fibre are laid at a minimum distance from each other onto a spacers. A hot melt adhesive is place over the fibres, near but not at their ends, to attach them to the spacing means. Further layers (or arrays) of fibres may be made and stacked onto the first layer. The layers are then bundled together. The ends of the fibres are held in a fugitive material while a potting resin is poured over a portion of the fibres including a portion containing the adhesive and spacers. After the potting resin hardens, the fugitive material is removed to re-open the ends of the membranes.

Figure 18:
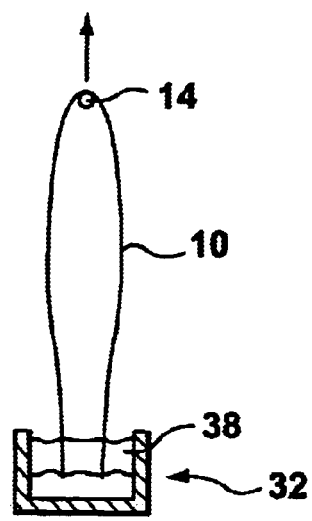

FIGS. 18 and 19 show methods in which precursor 10 is first potted and then stretched. In both cases, the precursor 10 is potted into a header 32 is made by any appropriate method. A support 14 is then placed through loops of the precursor 10. The entire assembly can then be placed in a controlled environment chamber 20, if necessary, and the supports 14 attached to a device for moving the supports 14 to stretch the precursor 10. Heating elements 62 may be configured to avoid heating the header 32 to much. Optionally or additionally, insulation, baffling or heat sinking can also be used to avoid overheating the header 32. Pre-cut lengths of precursor 10 may also be potted into pairs of opposed headers 32 and stretched by mounting the headers 32 into a support moving apparatus 18 as if they were supports 14. Because the precursor 10 is tougher than the membrane fibre 22, the precursor 10 can be arranged in a desired geometrical configuration or potted faster and with less breakage.

The invention may be practiced with many variations from the embodiments described above without departing from the scope of the invention which is defined by the following claims.

We claim:

1. A method for stretching a hollow fibre while making a stretched filtering membrane from a precursor, the method comprising the steps of,
    a) wrapping the hollow fibre around two or more supports; and,
    b) increasing the distance between adjacent supports, wherein,
    c) first portions of the hollow fibre between the supports are stretched to a first elongation and become porous to a first porosity; and
    d) second portions of the hollow fibre adjacent the supports are not stretched or are stretched to a second elongation less than the first elongation and remain non-porous or become porous to a second porosity which is less than the first porosity.

2. The method of claim 1 wherein the portions of the hollow fibre adjacent the supports remain non-porous.

3. The method of claim 1 wherein the first portions have pores in the ultrafiltration or microfiltration range.

4. The method of claim 1 further comprising a step, after step b) of claim 1, of maintaining the supports at the increased distance between adjacent supports or at a selected tension while annealing the hollow fibre.

5. The method of claim 1 further comprising subjecting the supports with hollow fibre wrapped around them to a controlled environment during step b) of claim 1.

6. The method of claim 4 further comprising subjecting the supports with hollow fibre wrapped around them to a controlled environment during step b) of claim 1 and during the annealing step.

7. A method of making a module of hollow fibre membranes comprising the steps of,
    (a) making a plurality of membranes according to claim 1, and
    (b) potting the membranes into a potting material in a header wherein second portions of the membranes are located at points where the membranes exit the potting material.

8. A method of making a module of hollow fibre membranes comprising the steps of,
    (a) providing a plurality of membranes each having
        (i) a first portion stretched to a first elongation and porous to a first porosity; and
        (ii) a second portion that is not stretched or is stretched to a second elongation less than the first elongation and is non-porous or is porous to a second porosity which is less than the first porosity; and,
    (b) forming loops of the membranes into a potting material in a header such that second portions of the membranes are located at the turns of the loops of the membranes.

9. The method of claim 8 wherein second portions of the membranes are also located at points where the membranes exit the potting material.

10. The method of claim 1 wherein the supports, after the distance between them has been increased, are arranged in a geometrical configuration such that the hollow fibre is in substantially the same geometrical configuration as it will have in a module.

11. The method of claim 10 wherein the hollow fibre is transferred from the supports to one or more replacement supports for potting, a replacement support located adjacent the second portions leaving a sufficient length of the second portions accessible for potting.

12. The method of claim 11 wherein the replacement support adjacent the second portions which will be potted remains with said second portions during potting and wherein after a potting material is hardened, said second portions are cut to expose open ends of membrane fibre and release the replacement support.

13. The method of claim 1 wherein the precursor is potted into one or more headers of a module before being stretched and the one or more headers act as one or more of the supports.

14. A method of potting hollow fibre membranes comprising the steps of
    (a) providing a plurality of membranes each having
        (i) a first portion stretched to a first elongation and porous to a first porosity; and
        (ii) a second portion that is not stretched or is stretched to a second elongation less than the first elongation and is non-porous or is porous to a second porosity which is less than the first porosity; and,
    (b) applying a hot melt adhesive to the second portions to temporarily hold adjacent fibres in relationship to each other during potting.

15. A method of potting hollow fibre membrane comprising the steps of,
    (a) providing a plurality of membranes each having
        (i) a first portion stretched to a first elongation and porous to a first porosity; and
        (ii) a second portion that is not stretched or is stretched to a second elongation less than the first elongation and is non-porous or is porous to a second porosity which is less than the first porosity; and,
    (b) applying a hot melt adhesive to the second portions so as to form a mass of hot melt adhesive with second portions sealed in it.

16. The method of claim 15 wherein the hollow fibre membrane is cut through or near the hot melt adhesive with second portions sealed in it and the hot melt adhesive with second portions sealed in it is glued into a pan to produce a header or manifold.

17. The method of claim 16 wherein the hot melt adhesive with second portions sealed in it is glued into the pan with a hot melt adhesive and the pan is a thermoplastic material such that the entire module is easily recycled.

18. The method of claim 15 wherein a channel is formed in one or more of said masses of hot melt adhesive with second portions sealed in it and open ends of the hollow fibre membrane are open to the channel.

* * * * *